United States Patent
Wang et al.

(10) Patent No.: US 11,093,300 B1
(45) Date of Patent: Aug. 17, 2021

(54) METHOD, ELECTRONIC DEVICE AND COMPUTER PROGRAM PRODUCT FOR PROCESSING INFORMATION

(71) Applicant: EMC IP Holding Company LLC, Hopkinton, MA (US)

(72) Inventors: Ren Wang, Shanghai (CN); Qi Wang, Shanghai (CN); Yun Zhang, Shanghai (CN); Ming Zhang, Shanghai (CN); Weiyang Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/039,876

(22) Filed: Sep. 30, 2020

(30) Foreign Application Priority Data

Aug. 7, 2020 (CN) .......................... 202010788974.6

(51) Int. Cl.
*G06F 3/00* (2006.01)
*G06F 9/54* (2006.01)

(52) U.S. Cl.
CPC ...................................... *G06F 9/54* (2013.01)

(58) Field of Classification Search
CPC .................................. G06F 9/54; G06G 9/54
USPC ........................................................ 719/328
See application file for complete search history.

(56) References Cited

U.S. PATENT DOCUMENTS

| | | | | |
|---|---|---|---|---|
| 2005/0102400 A1* | 5/2005 | Nakahara | ................ | H04L 29/06 709/225 |
| 2007/0136647 A1* | 6/2007 | Kanai | ................ | G06F 11/1032 714/785 |
| 2007/0266212 A1* | 11/2007 | Uchikado | ........... | G06F 11/1662 711/162 |
| 2013/0179739 A1* | 7/2013 | Ikegami | .............. | G06F 11/0766 714/57 |
| 2014/0297809 A1* | 10/2014 | Kim | ........................ | G06F 9/541 709/219 |
| 2018/0262502 A1* | 9/2018 | Frank | .................. | H04L 63/0823 |

OTHER PUBLICATIONS

Terry Disz, Software Accessing the SEED Genome Databases via Web Services API: Tools for Programmers. (Year: 2010).*
Karim O. Elish, On the Need of Precise Inter-App ICC Classification for Detecting Android Malware Collusions. (Year: 2015).*

* cited by examiner

*Primary Examiner* — Lechi Truong
(74) *Attorney, Agent, or Firm* — Chamberlain, Hrdlicka, White, Williams & Aughtry

(57) ABSTRACT

An information processing method that includes acquiring access information related to an access performed via an interface, the access information including an action identifier of an action to be executed via the interface, a response identifier for an execution result of the action, and an interface identifier of the interface. The method further includes determining, based on the action identifier, the response identifier, and the interface identifier, a target access identifier corresponding to the access information. The method further includes determining, based on the access information, time information associated with the access. The method further includes storing the target access identifier and the time information in an associated manner. Through this method, the recorded amount of data information is reduced, and disk space requirements and network transmission loads are lowered.

17 Claims, 5 Drawing Sheets

METHOD, ELECTRONIC DEVICE AND COMPUTER PROGRAM PRODUCT FOR PROCESSING INFORMATION

CROSS-REFERENCE TO RELATED APPLICATIONS

This application claims priority to Chinese Patent Application No. 202010788974.6 filed on Aug. 7, 2020. Chinese Patent Application No. 202010788974.6 is hereby incorporated by reference in its entirety.

TECHNICAL FIELD

Embodiments of the present disclosure relate to the field of information management, and in particular, to an information processing method, an electronic device, and a computer program product.

BACKGROUND

With the development of computer technology, more and more software systems and applications are implemented on one or more servers instead of locally on the users' machine. In this case, a user needs to be connected to a server. Then, data is processed and managed by accessing the software or applications in the server.

In addition, the software systems and the software applications running on servers have become more and more complex with the increase in functions. In order to reduce the complexity of users accessing these systems and applications, various Application Programming Interfaces (APIs) are generally set up in the systems and the applications for the users to use, so that the users can directly access the systems and the applications by means of the APIs without knowing details of the contents of the systems and the applications. However, there are still many problems to be solved in a process of accessing the server through the API and processing the data, such as the problem of access management.

SUMMARY OF THE INVENTION

Embodiments of the present disclosure provide an information processing method, an electronic device, and a computer program product.

According to a first aspect of the present disclosure, an information processing method is provided. The method includes acquiring access information related to an access performed via an interface, the access information including an action identifier of an action to be executed via the interface, a response identifier for an execution result of the action, and an interface identifier of the interface. The method further includes determining, based on the action identifier, the response identifier, and the interface identifier, a target access identifier corresponding to the access information. The method further includes determining, based on the access information, time information associated with the access. The method further includes storing the target access identifier and the time information in an associated manner.

According to a second aspect of the present disclosure, an electronic device is provided. The electronic device includes at least one processor; and a memory, coupled to the at least one processor and having instructions stored thereon. The instructions, when executed by the at least one processor, cause the device to perform actions. The actions include: acquiring access information related to an access performed via an interface, the access information including an action identifier of an action to be executed via the interface, a response identifier for an execution result of the action, and an interface identifier of the interface; determining, based on the action identifier, the response identifier, and the interface identifier, a target access identifier corresponding to the access information; determining, based on the access information, time information associated with the access; and storing the target access identifier and the time information in an associated manner.

According to a third aspect of the present disclosure, a computer program product is provided. The computer program product is tangibly stored on a nonvolatile computer-readable medium and includes machine-executable instructions; and the machine-executable instructions, when executed, cause a machine to perform the steps of the method in the first aspect of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings, and in the example embodiments of the present disclosure, the same reference numerals generally represent the same components.

FIG. 6 illustrates a schematic diagram of an example of a log file according to the embodiments of the present disclosure; and FIG. 7 illustrates a schematic block diagram of example device 700 suitable for implementing an embodiment of the present disclosure.

In the drawings, identical or corresponding reference numerals indicate identical or corresponding parts.

DETAILED DESCRIPTION

Figure 1:
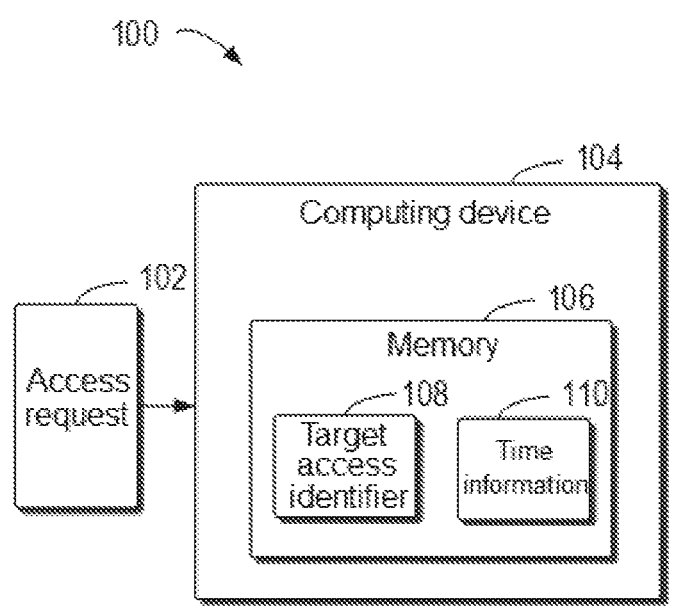
FIG. 1 illustrates a schematic diagram of example environment 100 where a device and/or a method according to an embodiment of the present disclosure may be implemented.

The embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of the embodiments of the present disclosure, the term "include" and similar terms thereof should be understood as open-ended inclusion, i.e., "including but not limited to." The term "based on" should be understood as "based at least in part on." The term "one embodiment" or "this embodiment" should be understood as "at least one embodiment." The terms "first," "second," etc. may refer to different or identical objects. Other explicit and implicit definitions may also be included below.

The principles of the present disclosure will be described below with reference to several example embodiments shown in the accompanying drawings. Although preferred embodiments of the present disclosure are shown in the accompanying drawings, it should be understood that these embodiments are described only to enable those skilled in the art to better understand and then implement the present disclosure, and are not intended to impose any limitation on the scope of the present disclosure.

Generally, users access various functions in a server via APIs. In order to analyze and improve the behaviors of the users and the performance of the APIs, it is usually necessary to collect API access information of the users. Then, the collected API access information may be analyzed to calculate the distribution, delay, frequency, etc. of an API access.

In a traditional scheme, a single API access event have result in two log entries being generated. Before the access to an API, one log entry is recorded to save start time, a path, and verbs. After the API access is completed, another log entry is recorded to save end time and a response code. The two log entries are identified by the same identification ID. However, in this way, logs are accumulated quickly, and the log data volume grow rapidly. This makes the volume of data transmitted in a log transmission process relatively large, leading to relatively high transmission cost. In addition, in order to save these data, a large number of input/output operations and more disk space are required.

In order to solve the above problems and other problems, the present disclosure provides an information processing method. In this method, a computing device acquires access information related to an access performed via an interface, and the access information includes an action identifier of an action to be executed via the interface, a response identifier for an execution result of the action, and an interface identifier of the interface. Then, the computing device determines, based on the action identifier, the response identifier, and the interface identifier, a target access identifier corresponding to the access information. The computing device also determines, based on the access information, time information associated with the access. The computing device then stores the target access identifier and the time information in an associated manner. Through this method, the recorded amount of data information is reduced, and disk space requirements and network transmission loads are lowered, so that information is easily acquired from users.

Hereinafter, FIG. 1 illustrates a schematic diagram of example environment 100 in which a device and/or a method according to embodiments of the present disclosure may be implemented.

As shown in FIG. 1, example environment 100 includes computing device 104. Computing device 104 is configured to process received access request 102, such as an API access request. One access request 102 shown in FIG. 1 is only an example, and is not a specific limitation to the present disclosure. Example environment 100 may include any number of access requests.

Computing device 104 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, etc.

Services or applications run in computing device 104, and these services or applications may be accessed through an interface, such as an API. After receiving access request 102, computing device 104 executes corresponding actions through the interface to acquire or process data.

In some embodiments, interface access request 102 includes an action to be performed for the access, such as a post or get action. In some embodiments, computing device 104 may use a network service to receive a corresponding interface access request, and then perform an access operation. After performing the access, computing device 104 may generate a response to access request 102, and return the response to a user. For this access, the network service in computing device 104 may record access information of this access.

The access information includes an interface identifier related to the access, an action to be performed via the interface, a response identifier, and time description information. In one example, the interface identifier is an interface path. In another example, the response identifier is represented by a response code. For example, the response identifier is 200, indicating that the access is successfully performed. If the user does not have an access permission and the access is consequently not successful, corresponding response identifier 401 will be generated. The above examples are only for describing the present disclosure, rather than specifically limiting the present disclosure.

In some embodiments, the time description information includes start time of the access and end time of the access. In some embodiments, the time description information includes start time of the access and a duration of the access. In some embodiments, the time description information includes end time of the access and a duration of the access. The above examples are only for describing the present disclosure, rather than specifically limiting the present disclosure.

Computing device 104 may use the acquired access information to generate log information associated with the access. Computing device 104 may use part of the access information, such as the interface identifier, the action identifier, and the response identifier, to generate target access identifier 108 corresponding to the access information. Then, time information 110 is stored in association with target access identifier 108 to form the log information for this access. Computing device 104 uses the other part of the access information, such as the time description information, to generate time information 110.

Computing device 104 then stores target access identifier 108 and time information 110 in an associated manner. For example, target access identifier 108 is used as a first item in a linked list or queue, and then time information 110 associated with target access identifier 108 is stored as an item in the linked list or queue in the manner of being associated with target access identifier 108.

Therefore, computing device 104 records the log information of this access. Computing device 104 records the log information in memory 106. When certain conditions are met, computing device 104 may store these pieces of log information in an external storage apparatus.

Through this method, the recorded amount of data information is reduced, and disk space requirements and network transmission loads are lowered.

Figure 2:
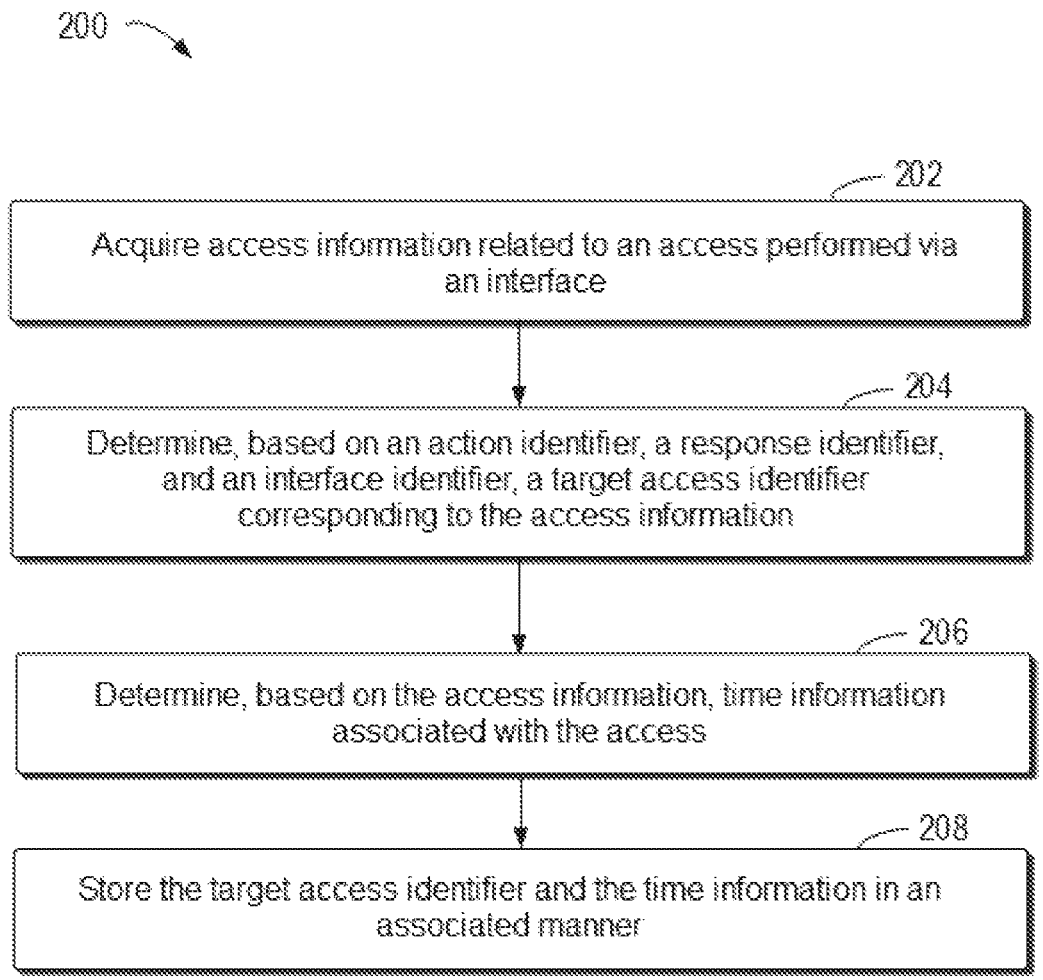
FIG. 2 illustrates a flowchart of information processing method 200 according to the embodiments of the present disclosure.

A schematic diagram of environment 100 in which a device and/or a method according to the embodiments of the present disclosure may be implemented is described above with reference to FIG. 1. The following describes a process for processing information according to the embodiments of the present disclosure with reference to FIG. 2. FIG. 2 illustrates a flowchart of information processing method 200 according to the embodiments of the present disclosure. Method 200 may be performed in computing device 104 in FIG. 1 or any other suitable devices.

At block 202, computing device 104 acquires access information related to an access performed via an interface. The access information includes an action identifier of an action to be performed via the interface, a response identifier for an execution result of the action, and an interface identifier of the interface.

In some embodiments, the interface identifier is an interface path, for example, an API path for user login is/api/v2/login. The response identifier is a response code, such as 200 and 401, where 200 indicates that the access is successful, and 401 indicates that the user has no access permission and the access is consequently not successful. The above examples are only for describing the present disclosure, rather than specifically limiting the present disclosure.

In some embodiments, the access information further includes time description information. In one example, the time description information includes start time of the access and end time of the access. For example, example access information includes: an action performed: POST, API path: /api/v2/login, access start time 2019-11-14T00:04:56.141, access end time 2019-11-14T00:04:56.233, and response code: 200. The above examples are only for describing the present disclosure, rather than specifically limiting the present disclosure.

In another example, the time description information includes start time of the access and a duration of the access. In yet another example, the time description information includes end time of the access and a duration of the access. The above examples are only for describing the present disclosure, rather than specifically limiting the present disclosure.

In some embodiments, computing device 104 acquires the action identifier and the interface identifier from access request 102 related to the access. In response to the end of the execution of the action, computing device 104 determines the response identifier. In this way, the access information can be quickly determined, which improves the data acquisition efficiency and reduces the amount of data that needs to be processed.

At block 204, computing device 104 determines, based on the action identifier, the response identifier, and the interface identifier, target access identifier 108 corresponding to the access information. In order to ensure the accuracy of the stored information, target access identifier 108 will be generated based on the action identifier, the response identifier, and the interface identifier.

In some embodiments, the response identifier, the action identifier, and the interface identifier are combined in sequence to form target access identifier 108. For example, when the access information is: an action performed: POST, API path: /api/v2/login, access start time 2019-11-14T00:04:56.141, access end time 2019-11-14T00:04:56.233, and response code: 200, the target identifier for the access information is: 200POST/api/v2/login. In some embodiments, target access identifier 108 is obtained by combining the action identifier, the response identifier, and the interface identifier in different sequences. In some embodiments, target access identifier 108 may be obtained by performing pre-determined processing on the action identifier, the response identifier, and the interface identifier. The above examples are only for describing the present disclosure, rather than specifically limiting the present disclosure.

At block 206, computing device 104 determines, based on the access information, time information 110 associated with the access. Generally, computing device 104 determines, according to the time description information in the access information, the time information 110.

In some embodiments, the time description information in the access information includes start time of the access and end time of the access. Computing device 104 uses the start time and the end time to determine an access duration. Computing device 104 then determines the time information based on the start time and the access duration. In this way, the time information to be stored can be quickly determined, the amount of data to be stored is reduced, and the storage efficiency is improved.

In some embodiments, time information 110 is a combination of the number of seconds corresponding to the start time of the access and the number of seconds of the duration of the access. In one example, the start time is 2019-11-14T00:04:56.141, and the number of seconds in a day corresponding to the start time is ((0 hour*24)+4 minutes*60)+56 seconds)*1000+141=296141 milliseconds; and the duration between the start time 2019-11-14T00:04:56.141 and the end time 2019-11-14T00:04:56.233 is 92 ms. At this moment, time information 110 is: 296141:92. The above examples are only for describing the present disclosure, rather than specifically limiting the present disclosure. In some embodiments, the time description information may be used as time information 110. In some embodiments, time information 110 may be determined in any suitable manner according to the time description information. The above examples are only for describing the present disclosure, rather than specifically limiting the present disclosure.

At block 208, computing device 104 stores target access identifier 108 and time information 110 in an associated manner. Computing device 104 needs to store determined target access identifier 108 and time information 110. The process of storing the target access identifier and the time information will be described in detail below with reference to FIG. 3.

In one example, computing device 104 stores these pieces of target access information and time information in memory 106. The above examples are only for describing the present disclosure, rather than specifically limiting the present disclosure.

In some embodiments, when there are many access identifiers and time information stored in a region for storing access log information, these access identifiers and time information need to be stored from memory 106 to an external storage apparatus.

Computing device 104 may store, based on one or more rules, the data from memory 106 to the external storage apparatus. As an example, such a rule may be to store log data into a log file of the external storage apparatus at the end time of a preset time period, for example, a user sets the end time of every day or every hour. As another example, when a duration in which the interface is not accessed exceeds a threshold duration, the log data is stored into the log file of the external storage apparatus. For example, the duration in which all the interfaces in computing device 104 are not accessed is longer than 5 minutes. Alternatively, for example, when the number of times that the interface is accessed exceeds a threshold number of times, the log data may be stored into a log file of the external storage apparatus, for example, all the interfaces are accessed more than 10,000 times. Through the above method, the time to store the data to the external storage apparatus is determined in a suitable way, thereby enhancing the user experience and improving the storage efficiency. The above examples are only for describing the present disclosure, rather than specifically limiting the present disclosure.

In some embodiments, computing device 104 sets a second storage region in memory 106 to store future access identifiers and future time information for future accesses before storing target access identifier 108 and time information 110 to the external storage apparatus. The second storage region is different from a first storage region where target access identifier 108 is stored. This method can prevent new log data from being stored when transferring generated log data, thereby improving the accuracy of the data.

Through this method, the recorded amount of data information is reduced, and disk space requirements and network transmission loads are lowered, so that information is easily acquired from users.

The above describes a flowchart of information processing method 200 according to the embodiments of the present disclosure with reference to FIG. 2. The following describes a flowchart of method 300 for storing a target access identifier and time information according to the embodiments of the present disclosure with reference to FIG. 3. Method 300 may be implemented as computing device 104 in FIG. 1 or any other suitable devices.

At block 302, computing device 104 determines whether target access identifier 108 exists in stored historical access identifiers. The historical access identifiers are related to previous accesses performed via the interface.

Figure 4:
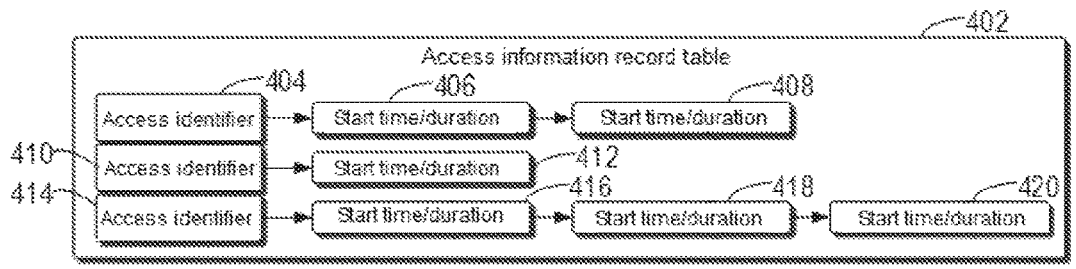
FIG. 4 illustrates a schematic diagram of example 400 of an access information record table according to the embodiments of the present disclosure.

In one example, the historical access identifiers and their time information are stored in an access information record table. In one example, the access information record table includes a plurality of linked lists. As shown in FIG. 4, access information record table 402 includes three linked lists. The first items of the linked lists are access identifiers 404, 410, and 414, respectively. The access identifiers are determined using the action identifier, the response identifier, and the interface identifier as described above. Following time information items 406, 408, 412, 416, 418, and 420 in each linked list all include the start time and durations of corresponding accesses. Linked lists for the three access identifiers shown in FIG. 4 are merely an example, rather than specifically limiting the present disclosure. Those skilled in the art can set the number of the linked lists as required.

In another example, the access information record table may include different arrays corresponding to different access identifiers. The first item of each array is used to store the access identifier, and the following items are used to store time information corresponding to the access identifier. The above examples are only for describing the present disclosure, rather than specifically limiting the present disclosure.

Now returning to FIG. 3, if it is determined that target access identifier 108 does not exist in the stored historical identifiers, the method proceeds to block 304, and computing device 104 stores target access identifier 108. After target access identifier 108 is stored, the method proceeds to block 306, and computing device 104 stores time information 110 and target access identifier 108 in an associated manner. In this way, the accuracy of data storage and the storage efficiency are improved.

If it is determined that target access identifier 108 exists in the stored historical access identifiers, the method proceeds to block 306, and computing device 104 stores time information 110 and target access identifier 108 in an associated manner. For example, the time information and the target access identifier are directly stored in the linked list or array corresponding to target access identifier 108. In this way, the storage of the time information can be realized quickly, the amount of data to be stored is reduced, and the data processing efficiency is improved.

Through the above method, the recorded amount of data is reduced, the accuracy of data storage is improved, and the stored information is easily obtained from users.

Figure 3:
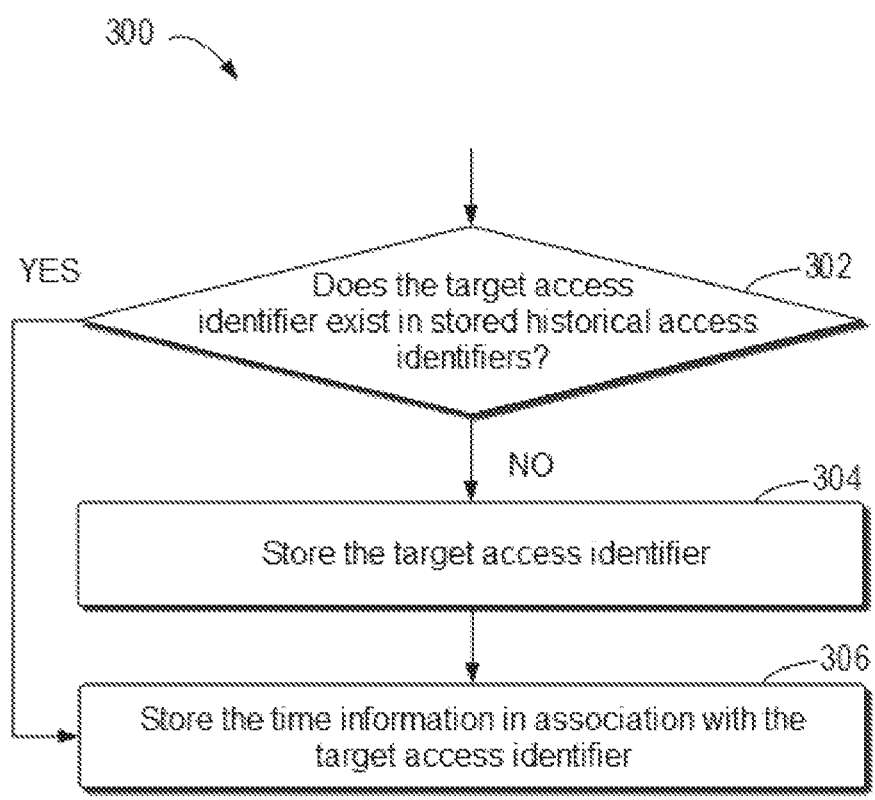
FIG. 3 illustrates a flowchart of method 300 for storing a target access identifier and time information according to the embodiments of the present disclosure.
Figure 5:
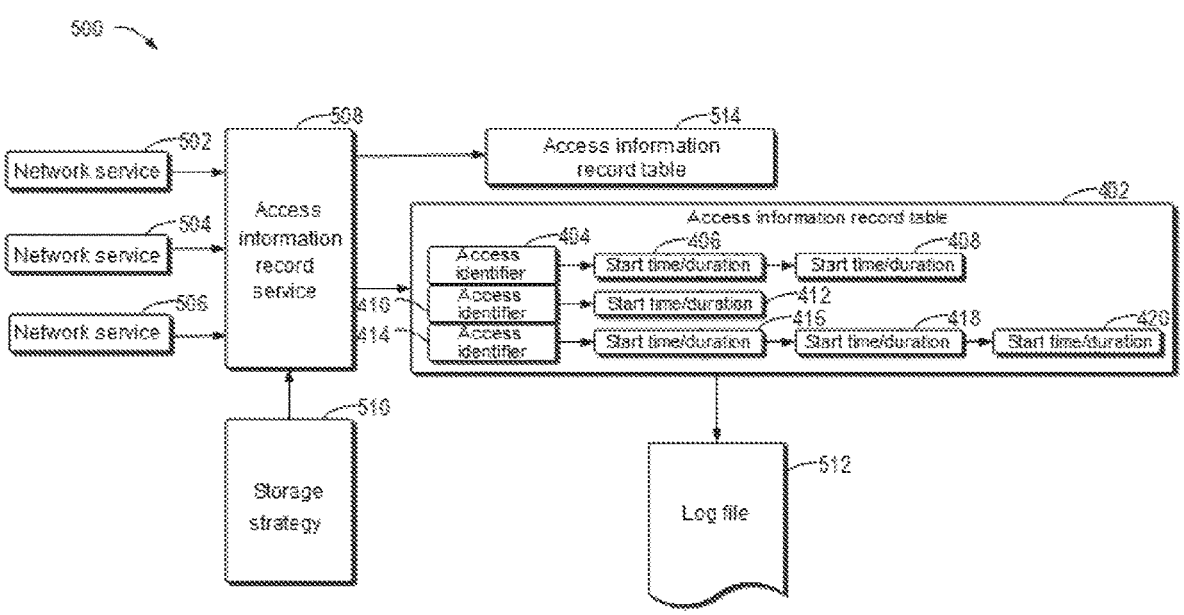
FIG. 5 illustrates a schematic diagram of process 500 of generating a log file according to the embodiments of the present disclosure.
Figures 6, 7:
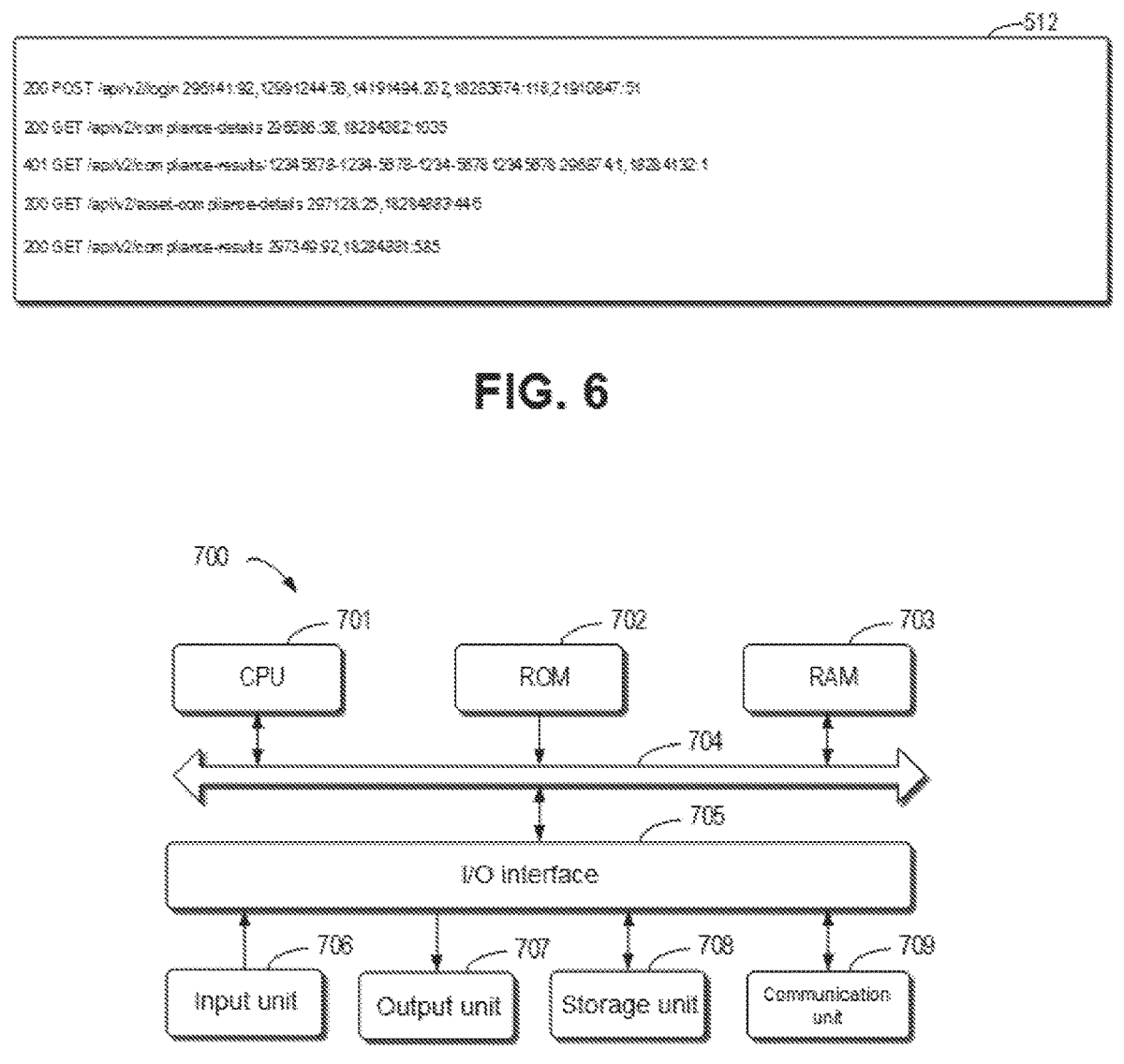

The above describes the process for storing the target access identifier and the time information with reference to FIG. 3 and FIG. 4. A process for generating a log file will be described below with reference to FIG. 5 to FIG. 7. FIG. 5 illustrates a schematic diagram of process 500 for generating a log file according to the embodiments of the present disclosure. FIG. 6 illustrates a schematic diagram of an example of a log file according to the embodiments of the present disclosure.

As shown in FIG. 5, each of network services 502, 504, and 506 manages one or more access requests, such as API access requests. Access information record service 508 may receive access information for an access from network services 502, 504, and 506. Then, access information record service 508 will record the access information into access information record table 402.

Access information record service 508 stores data in the access information table into log file 512 according to a strategy provided in storage strategy 510. In one example, storage strategy 510 is to store the data into log file 512 at the end of a preset time period. In another example, when the duration in which the interface is not accessed exceeds a threshold duration, the data is stored into log file 512. In yet another example, when the number of times that the interface is accessed exceeds a threshold number of times, the data is stored into log file 512. In some implementation examples, log file 512 is located on an external storage apparatus. The above examples are only for describing the present disclosure, rather than specifically limiting the present disclosure.

Before access information record table 402 is stored into log file 512, new access information record table 514 is generated to store log information for future accesses. In this way, in the process of storing access information record table 402 into log file 512, no new information will be stored in access information record table 402. This may realize transferring of access log information at any suitable time.

FIG. 6 illustrates specific content of log file 512, including log information for 5 access identifiers. Each log includes a response identifier, an execution action, an interface identifier, and at least one piece of time information.

FIG. 7 illustrates a schematic block diagram of example device 700 that can be configured to implement an embodiment of the present disclosure. For example, computing device 104 as shown in FIG. 1 may be implemented by device 700. As shown in the figure, device 700 includes central processing unit (CPU) 701 that may perform various appropriate actions and processing according to computer program instructions stored in read-only memory (ROM) 702 or computer program instructions loaded from storage unit 708 to random access memory (RAM) 703. Various programs and data required for operations of device 700 may also be stored in RAM 703. CPU 701, ROM 702, and RAM 703 are connected to each other through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices over a computer network such as the Internet and/or various telecommunication networks.

The various processes and processing described above, for example, methods 200 and 300, may be performed by processing unit 701. For example, in some embodiments, methods 200 and 300 may be implemented as a computer software program that is tangibly included in a machine-readable medium such as storage unit 708. In some embodiments, part or all of the computer program may be loaded and/or installed onto device 700 via ROM 702 and/or communication unit 709. When the computer program is loaded into RAM 703 and executed by CPU 701, one or more actions of methods 200 and 300 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or a raised structure in a groove having instructions stored thereon, and any suitable combination thereof. The computer-readable storage medium used here is not explained as transient signals themselves, such as radio waves or other freely propagating electromagnetic waves, electromagnetic waves propagating through waveguides or other transmission media (e.g., optical pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++, and conventional procedural programming languages such as "C" language or similar programming languages. The computer-readable program instructions may be executed entirely on a user computer, partly on a user computer, as a standalone software package, partly on a user computer and partly on a remote computer, or entirely on a remote computer or a server. In the case where a remote computer is involved, the remote computer may be connected to a user computer over any kind of networks, including a local area network (LAN) or a wide area network (WAN), or may be connected to an external computer (e.g., connected over the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions so as to implement various aspects of the present disclosure.

Various aspects of the present disclosure are described here with reference to flowcharts and/or block diagrams of the methods, the apparatuses/systems, and the computer program products according to the embodiments of the present disclosure. It should be understood that each block in the flowcharts and/or block diagrams as well as a combination of blocks in the flowcharts and/or block diagrams may be implemented by using the computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. The computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, or to enable other persons of ordinary skill in the art to understand the embodiments disclosed herein.

The invention claimed is:

1. An information processing method, comprising:
acquiring access information related to an access performed via an application programming interface (API), the access information comprising an action identifier of an action to be executed via the API, a response identifier for an execution result of the action, and an interface identifier of the API, wherein the response identifier is code indicating success of the access and the interface identifier is an interface path;
determining, based on the action identifier, the response identifier, and the interface identifier, a target access identifier corresponding to the access information;
determining, based on the access information, time information associated with the access; and
storing the target access identifier and the time information in an associated manner; wherein storing the target access identifier and the time information in the associated manner comprises:
determining whether the target access identifier exists in stored historical access identifiers, the historical access identifiers being related to previous accesses performed via the API; and
when the target access identifier exists in the historical access identifiers, storing the time information in association with the target access identifier.

2. The method according to claim 1, wherein acquiring the access information comprises:
acquiring the action identifier and the interface identifier from an access request related to the access; and
in response to an end of execution of the action, determining the response identifier.

3. The method according to claim 1, wherein storing the target access identifier and the time information in the associated manner further comprises:
when the target access identifier does not exist in the stored historical access identifiers,
storing the target access identifier; and
storing the time information in association with the target access identifier.

4. The method according to claim 1,
wherein the access information further comprises a start time of the access and end time of the access; and
determining, based on the access information, the time information associated with the access further comprises:
determining, based on the start time and the end time, an access duration; and
determining, based on the start time and the access duration, the time information.

5. The method according to claim 1, further comprising:
storing the target access identifier and the time information from a memory to an external storage apparatus based on at least one selected from a group consisting of:
end time of a preset time period;
a duration in which the API is not accessed exceeding a threshold duration; or
a number of times that the API is accessed exceeds a threshold number of times.

6. The method according to claim 5, further comprising:
before storing the target access identifier and the time information in the external storage apparatus in a first storage region, setting a second storage region in the memory to store future access identifiers and future time information of future accesses, the second storage region being different from the first storage region storing the target access identifier.

7. An electronic device, comprising:
at least one processor; and
a memory, coupled to the at least one processor and having instructions stored thereon, wherein when executed by the at least one processor, the instructions cause the electronic device to perform the following actions comprising:
acquiring access information related to an access performed via an application programming interface (API), the access information comprising an action identifier of an action to be executed via the API, a response identifier for an execution result of the action, and an interface identifier of the API, wherein the response identifier is code indicating success of the access and the interface identifier is an interface path;
determining, based on the action identifier, the response identifier, and the interface identifier, a target access identifier corresponding to the access information;
determining, based on the access information, time information associated with the access; and
storing the target access identifier and the time information in an associated manner; wherein storing the target access identifier and the time information in the associated manner comprises:
determining whether the target access identifier exists in stored historical access identifiers, the historical access identifiers being related to previous accesses performed via the API; and when the target access identifier exists in the historical access identifiers, storing the time information in association with the target access identifier.

8. The electronic device according to claim 7, wherein acquiring the access information comprises:
acquiring the action identifier and the interface identifier from an access request related to the access; and
in response to an end of execution of the action, determining the response identifier.

9. The electronic device according to claim 7, wherein storing the target access identifier and the time information in the associated manner further comprises:
when the target access identifier does not exist in the stored historical access identifiers,
storing the target access identifier; and
storing the time information in association with the target access identifier.

10. The electronic device according to claim 7,
wherein the access information further comprises start time of the access and end time of the access; determining, based on the access information, the time information associated with the access further comprises:
determining, based on the start time and the end time, an access duration; and
determining, based on the start time and the access duration, the time information.

11. The electronic device according to claim 7, wherein the actions further comprise:
storing the target access identifier and the time information from a memory to an external storage apparatus based on at least one selected from a group consisting of:
end time of a preset time period;
a duration in which the API is not accessed exceeding a threshold duration; or
a number of times that the API interface is accessed exceeds a threshold number of times.

12. The electronic device according to claim 11, wherein the actions further comprise:
before storing the target access identifier and the time information in the external storage apparatus in a first storage region, setting a second storage region in the memory to store future access identifiers and future time information of future accesses, the second storage region being different from the first storage region storing the target access identifier.

13. A non-transitory computer readable medium comprising computer readable program code, which when executed by a computer processor enables the computer processor to perform a method, the method comprising:
acquiring access information related to an access performed via an application programming interface (API), the access information comprising an action identifier of an action to be executed via the API, a response identifier for an execution result of the action, and an interface identifier of the API, wherein the response identifier is code indicating success of the access and the interface identifier is an interface path;
determining, based on the action identifier, the response identifier, and the interface identifier, a target access identifier corresponding to the access information;
determining, based on the access information, time information associated with the access; and
storing the target access identifier and the time information in an associated manner, wherein storing the target access identifier and the time information in the associated manner comprises:
determining whether the target access identifier exists in stored historical access identifiers, the historical access identifiers being related to previous accesses performed via the API; and
when the target access identifier exists in the historical access identifiers, storing the time information in association with the target access identifier.

14. The non-transitory computer readable medium according to claim 13, wherein acquiring the access information comprises:
acquiring the action identifier and the interface identifier from an access request related to the access; and
in response to an end of execution of the action, determining the response identifier.

15. The non-transitory computer readable medium according to claim 13, wherein storing the target access identifier and the time information in the associated manner further comprises:
when the target access identifier does not exist in the stored historical access identifiers,
storing the target access identifier; and
storing the time information in association with the target access identifier.

16. The non-transitory computer readable medium according to claim 13,
wherein the access information further comprises a start time of the access and end time of the access; and
determining, based on the access information, the time information associated with the access further comprises:
determining, based on the start time and the end time, an access duration; and
determining, based on the start time and the access duration, the time information.

17. The non-transitory computer readable medium according to claim 13, the method further comprising:
storing the target access identifier and the time information from a memory to an external storage apparatus based on at least one selected from a group consisting of:
end time of a preset time period;
a duration in which the API is not accessed exceeding a threshold duration; or
a number of times that the API is accessed exceeds a threshold number of times.

* * * * *